Mar. 20, 1923.
J. E. DAVIS
1,448,915
PROCESS FOR PLACING FOIL WRAPPERS UPON CIGARS
Filed Nov. 11, 1920
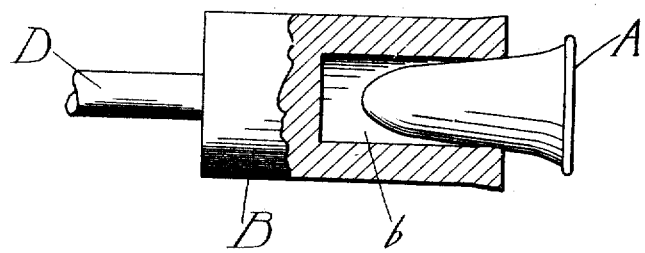
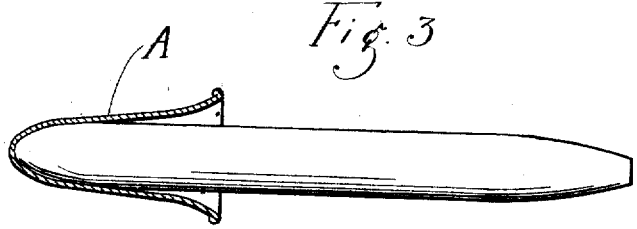

Patented Mar. 20, 1923.

1,448,915

UNITED STATES PATENT OFFICE.

JOHN E. DAVIS, OF CINCINNATI, OHIO.

PROCESS FOR PLACING FOIL WRAPPERS UPON CIGARS.

Application filed November 11, 1920. Serial No. 423,270.

*To all whom it may concern:*

Be it known that I, JOHN E. DAVIS, a citizen of the United States of America, and a resident of Cincinnati, in the county of Hamilton and State of Ohio, have invented a new and useful Improvement in a Process for Placing Foil Wrappers upon Cigars, of which the following is a specification.

My invention relates to a process for closing the end of a foil wrapper upon the end of a cigar.

The object of my invention is a process for sealing the end of a foil wrapper, that will produce a smooth finish and will not mar the foil.

In the accompanying drawing, in which I have illustrated a means by which my process may be practiced, Fig. 1, is a view partly in side elevation and partly in section of a driving shaft, a fibre sleeve and a thimble for use in practicing my invention.

Figs. 2 and 3, are sectional views of a thimble and of a cigar and a foil wrapper, showing the steps involved in closing the end of the wrapper.

In carrying out my process, I utilize a metal thimble A which has a closed end portion $a$, which is substantially of the shape of the end of the cigar, and a tapering portion $a'$, which is of a length equal substantially to two or two and one half times the outer diameter $a^2$ of the portion $a$, and which gradually flares outward to a size much larger than the end of the cigar.

Thimble A is seated by friction in a cylindrical recess $b$ of a fibre holder B, which is secured upon a driving shaft D, such as the shaft of an electric motor.

In practicing my invention the thimble A is revolved at a rate of seven hundred or more revolutions per minute.

Then the end of a cigar bearing the foil that is to be closed, is introduced into the flared end of the thimble, which guides the end of the cigar accurately into the portion $a$ of the thimble. The rapid rotation of the thimble, the conformity of the portion to the shape of the end of the cigar and the smooth inner surface of portion $a$, cooperate to close the end of the foil snugly to give it a nice burnished finish, and compacts the end of the foil, giving it the appearance of a spun bead.

Having thus described my invention, what I claim is:—

1. A process for closing the end of a foil cigar wrapper, comprising placing the foil loosely upon a cigar and then subjecting the end of the foil to contact with the interior of a tapered thimble which is revolving at a high rate of speed.

2. A process for closing the end of a foil cigar wrapper, comprising placing the foil loosely upon a cigar and then subjecting the end of the foil to contact with the interior of a tapered thimble which is revolving at a speed in excess of 700 revolutions per minute.

3. A process for closing the end of a foil cigar wrapper, comprising guiding the end of the cigar bearing the foil by a flared end of a rapidly revolving thimble to the inside of a section thereof that conforms to the shape of said cigar end.

In testimony whereof, I have hereunto subscribed my name this 8th day of November, 1920.

JOHN E. DAVIS.